Patented Apr. 15, 1947

2,419,021

UNITED STATES PATENT OFFICE 2,419,021

BACTERICIDE AND ALGAECIDE

Charles Warren Harnden, Berkeley, Calif., assignor to Shell Development Company, San Francisco, Calif., a corporation of Delaware No Drawing. Application November 18, 1943, Serial No. 510,825

7 Claims. (Cl. 167—22)

The present invention relates to bactericides and algaecides and pertains particularly to compositions which are especially suitable for controlling bacteria and obnoxious algae in water-cooling and disposal systems.

The agents, e. g., chlorine, heretofore proposed for combating obnoxious algae and bacteria and the like in water-cooling and disposal systems, have been found unsatisfactory and under certain conditions entirely unsuitable for various reasons. It is, therefore, an object of this invention to provide an improved bactericidal and algaecidal composition especially suited for use in water-treating systems such as water-cooling and disposal systems.

It has now been found that saturated hydrocarbons of at least 3 carbon atoms, preferably those containing 3 to 6 and having at least 3 Cl atom substituents, of which at least 2 Cl atoms are on secondary carbon atoms, and mixtures containing these compounds are highly effective and inexpensive agents for combating algae or bacteria which accumulate or grow in water-treating systems such as water-cooling and disposal systems. Suitable compounds include, for example, 1,2,2-trichloropropane, 1,2,2,3-tetrachloropropane, 1,2,3-trichlorobutane, 1,2,3,4-tetrachlorobutane, 1,3,3-trichlorobutane, 1,1,2,3,4,4-hexachlorobutane, 1,2,3 - trichloropentane, 1,2,3,4,5-trichloropentane, 3,4,5-trichlorohexane, etc. The trichlorobutanes of this type are preferred. Especially effective are trichlorobutane-containing mixtures which may be obtained as by-products in the manufacture of butadiene, utilizing low temperature chlorination of butenes, the main product, dichlorobutane, being separated from the present higher boiling trichlorobutane-containing mixtures and then subjected to high temperature dehydrochlorination to form butadiene. This trichlorobutane mixture contains about 40% to 60% trichlorobutanes, consisting mainly of 1,2,3-trichlorobutane, 5% to 20% dichlorobutanes, 5% to 20% dichloropentanes.

The present bactericidal and algaecidal compositions are particularly and especially effective for combating the growth and accumulation of bacteria and algae in the bottoms and on the sides of tanks, basins, filters of gravel, excelsior and the like such as are used in water-cooling systems, salt water disposal systems in oil filters, etc. The present agents are particularly advantageous for this purpose due to their tendency to coat surfaces and to their high specific gravity of about 1.4, whereby the treating agents sink through water and coat the sides and bottoms of the water tanks, basins, etc., on which the algae and bacterial growth accumulates.

The present agents are generally added to the water in such water-treating systems at the rate of 2 or 3 P. P. M. to 20 P. P. M. or sometimes as high as 50 P. P. M. or more.

In one particular application, bacterial growth in the filters of salt water disposal system was controlled by the present agents, thereby permitting the disposal system to operate smoothly. Ordinarily, without treating with the present agents, the filters, and also in some cases the sand layer into which the water is injected and disposed, are clogged due to sulfate reducing bacteria which act upon iron sulfates present in the water by contact with iron treating vessels. As used in oil fields, the process of water disposal, in which the present agents are effectively utilized, comprises the steps of separating the oil from the water, thereafter introducing the present agents, e. g., a trichlorobutane mixture obtained in the manufacture of butadiene, as above described, into the water at a rate of about 10 P. P. M., passing the treated water through a filter section composed of excelsior, gravel, etc., and then introducing the water into a porous stratum through an injection well. By the above process salt water can be separated from produced oil and efficiently disposed into a porous stratum without periodic clogging of the filters (which are generally found necessary) and the porous sand stratum.

The present agents may also be used in various other water-treating systems such as, for example, in water-cooling tower systems, to control or to prevent the accumulation of algae in the water basins, tanks, etc. If water for human or animal consumption is treated with the present agents, care should be taken that the concentration thereof does not approach toxic limits.

The present agents may, in some cases, be more efficiently applied as oil solution or aqueous emulsions. Suitable emulsifiers include, for example, various soaps, such as potassium fish-oil soap, sodium oleate, sodium resinate, triethanolamine soaps; sulfated and sulfonated preparations, such as sodium lauryl sulfate, sodium stearyl sulfate, sodium oleyl sulfate, and sodium salt of sulfonated esters of dicarboxylic acids; proteins, such as casein, egg albumen, and glue; casein-lime and casein-ammonia, fatty acid esters, such as the esters of cocoanut oil fatty acids, glyceryl mono-oleate, polyethylene glycol esters, etc.; amine salts; and the like, or combinations and mixtures thereof. A particularly effective emulsifier mixture is composed of 3 parts of esters of cocoanut fatty acids and 1 part of the sodium salt of sulfonated ester of dicarboxylic acids. The emulsifiers may be used in amounts ranging from .1% to 10% or more.

I claim as my invention:

1. A bactericidal and algaecidal composition comprising a mixture including 40% to 60% trichlorobutanes having at least 2 secondary chlorine atoms, 5% to 20% dichlorobutane and 10% to 25% dichloropentanes, and a minor amount of an emulsifying agent.

2. A method of controlling bacteria, algae and the like present in water-treating systems, comprising introducing into said contaminated water a small proportion of a trichloro saturated hydrocarbon of 3 to 6 carbon atoms and having at least 2 secondary chlorine atoms.

3. The method of controlling bacteria, algae and the like present in water-treating systems, comprising adding to said contaminated water 2 to 50 P. P. M. of a trichloro saturated hydrocarbon of 3 to 6 carbon atoms and having at least 2 secondary chlorine atoms.

4. A method of controlling bacteria, algae and the like present in water-treating systems, comprising introducing into said contaminated water a small proportion of a trichlorobutane having at least 2 secondary chlorine atoms.

5. A method of controlling bacteria, algae and the like present in water-treating systems, comprising introducing into said contaminated water a small proportion of a liquid mixture containing trichlorobutane having at least 2 secondary chlorine atoms.

6. A method of controlling bacteria, algae and the like present in water-treating systems, comprising introducing into said contaminated water a small proportion of a liquid mixture containing 1,2,3-trichlorobutane.

7. A method of controlling bacteria, algae and the like present in water-treating systems, comprising introducing into said contaminated water a small proportion of a mixture including 40% to 60% trichlorobutanes having at least 2 secondary chlorine atoms, 5% to 20% dichlorobutane and 10% to 25% dichloropentanes.

CHARLES WARREN HARNDEN.

REFERENCES CITED

The following references are of record in the file of this patent:

UNITED STATES PATENTS

| Number | Name | Date |
|---|---|---|
| 2,230,001 | McConnell et al. | Jan. 28, 1941 |

FOREIGN PATENTS

| Number | Country | Date |
|---|---|---|
| 103,206 | Australian | Feb. 17, 1938 |

OTHER REFERENCES

McCawley, Chemical Abstracts, vol. 36, 1942, page 4911.

Goodhue et al., Jr. Econ. Entom., Aug. 1942, pages 533-536.

Heilbron, Dictionary of Organic Compounds, 1934, vol. 1, pages 475, 499; vol. 3, pages 816, 817.

Albright, Bradford Water Flooding Principles, The Oil Weekly, Sept. 13, 1937, pages 48 and 50.

Ryder, Preparation of Flooding Water to Prevent Plugging Oil Sand, The Oil and Gas Journal, Sept. 23, 1937, pages 60 and 62.